Patented Oct. 8, 1940

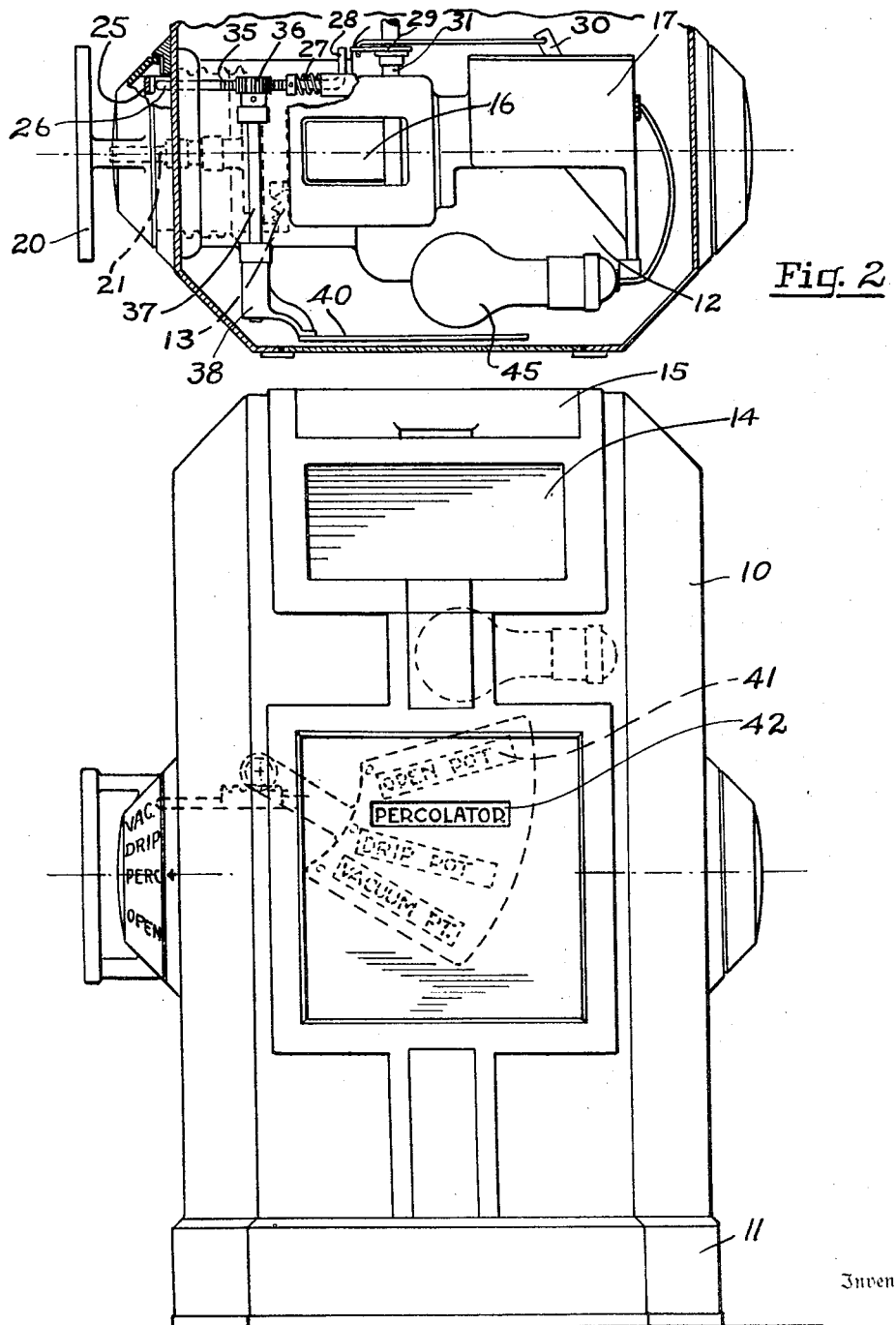

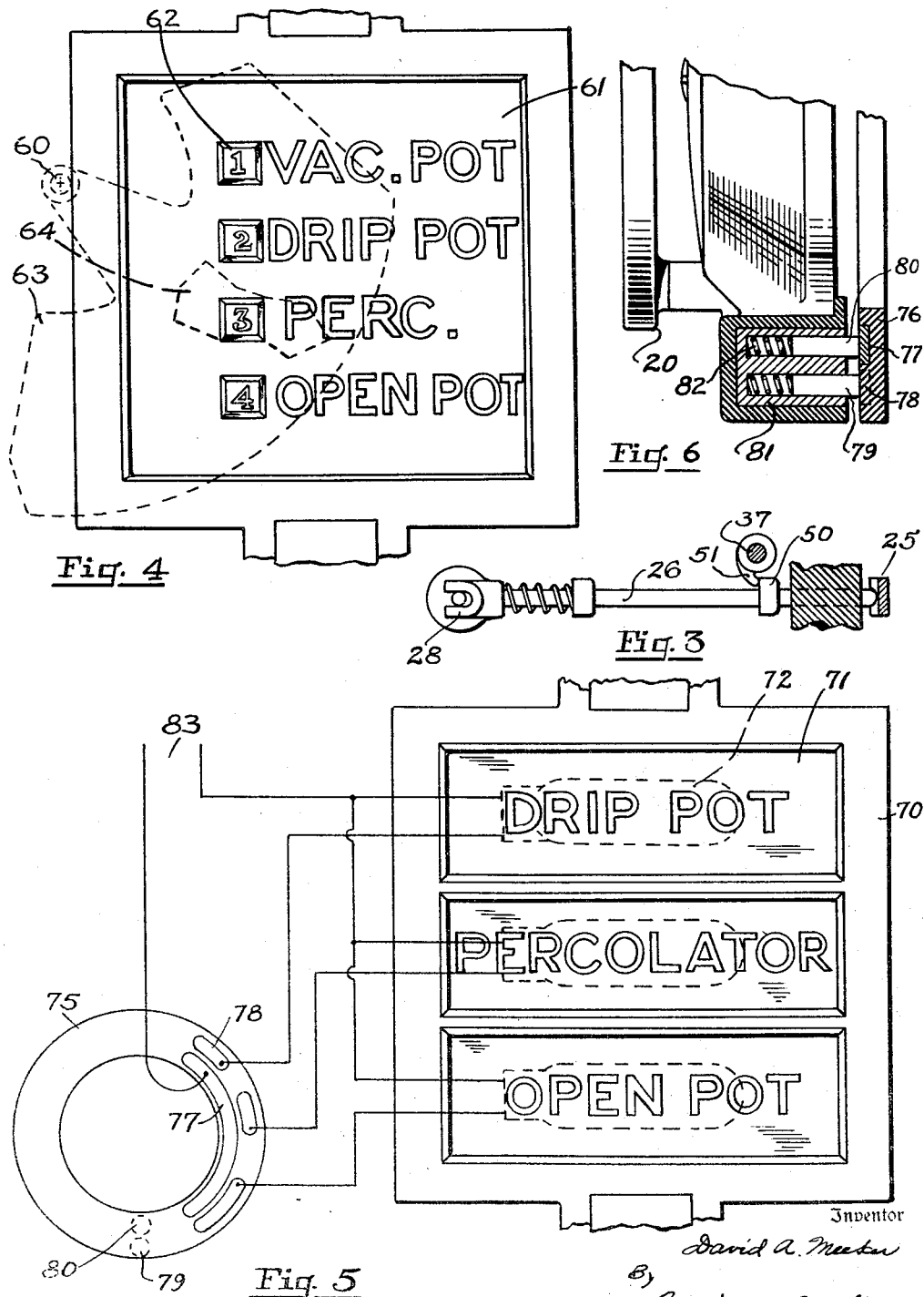

2,217,070

UNITED STATES PATENT OFFICE 2,217,070

FOOD HANDLING APPARATUS

David A. Meeker, Troy, Ohio, assignor to The Hobart Manufacturing Company, Troy, Ohio, a corporation of Ohio Original application August 26, 1936, Serial No. 97,972. Divided and this application February 15, 1938, Serial No. 190,638

3 Claims. (Cl. 83—18)

This invention relates to food handling apparatus and more particularly to coffee mills.

It is a principal object of the invention to provide a coffee mill adjustable to a plurality of grades of fineness of grind and which affords direct visual indication to the customer of the setting of the mill.

It is a further object to provide in a mill of this character an indicating device which is simple and efficient in construction and which provides a prominent visual indication to the customer.

It is also an object to provide in such a coffee mill an indicator having markings thereon corresponding to the several grades of fineness, the markings being selectively illuminated to provide the desired visual indication to the customer in accordance with the setting of the mill.

Other objects and advantages will be apparent from the description, the accompanying drawings and the appended claims.

In the drawings—

Fig. 1 is a view in side elevation of a coffee mill constructed in accordance with the present invention;

Fig. 2 is a plan view of the mill with the upper portions of the casing removed to show the construction of the mill;

Fig. 3 is a detailed horizontal sectional view showing a modified form of control and operating mechanism;

Fig. 4 is a partial side elevational view showing a modified form of construction of the indicating means;

Fig. 5 is a view partially schematic and partially in side elevation showing a still further modified construction of indicating means; and Fig. 6 is a fragmentary vertical sectional view showing a detail of the construction of Fig. 5.

This application is a division of copending application Serial No. 97,972 filed August 26, 1936.

Referring to the drawings which disclose a preferred embodiment of the invention, the coffee mill comprises a main housing 10 comprising enclosing wall portions mounted upon a base structure 11. The mill is provided with motive power means 12 such as an electric driving motor, and grinding burrs 13 operatively driven thereby. At the top of the mill is a hopper 14 for receiving the coffee to be ground, which may be closed by a pivoted cover 15. A gate member 16 at the lower end of the hopper controls the supply of coffee from the hopper into the grinding burrs, and the motor switch 17 controls the operation of the motor.

Positioned at one end of the mill is the grade selector means 20. This preferably comprises a ring shaped portion adapted to be rotatably operated by the clerk or user of the mill, to provide for adjusting and predetermining the grade of fineness of grind. The grade selector member is mounted on a threaded part of the mill and in response to rotation, the grade selector member moves inwardly or outwardly, causing the shaft 21 to move axially, to thereby effect control of the spacing of burrs 13. Such grade selecting means has not been shown in detail because it is well known and understood in the art. Preferably the grade selector means comprises a structure such as shown in applicant's Patent No. 2,090,634 dated August 24, 1937, and assigned to the same assignee as this application.

Operatively associated with the grade selector mechanism and the grinding burrs, is an interlock means for regulating the control of the machine in accordance with the setting of the grade selector. This means may comprise a cam 25 located upon the inner portion of the grade selector handle, which is adapted to cooperate with an axially movable shaft 26 mounted for sliding axial movement. Spring means 27 tends normally to urge the shaft toward the cam and to maintain engagement therebetween. The shaft may be provided with interlock fingers 28 adapted to cooperate with links 29 connected to the motor switch operating member 30 and to the shaft 31 of the pivoted gate 16 to provide for interlocking action thereof. This shaft preferably extends to the exterior of the mill casing where an operating handle is provided in convenient position for the clerk or operator. Operation of such handle to one position effects opening of the gate from the hopper to supply the material to the grinding burrs, and the closing of the motor switch; the reverse takes place upon opposite movement thereof. The purpose of interlock mechanism of this character is to assure that the clerk, at each operation of the mill, will be required to adjust the grade selector to a predetermined setting; the interlock structure prevents the turning on of the motor switch, or the opening of the gate to feed coffee from the hopper, or both, unless the grade selector has been turned or adjusted from its neutral or off position to one of its several grinding positions. The clerk being thus required to effect adjustment of the grade selector at each operation of the mill is more likely to ascertain the wishes of the individual customer, and to adjust the grade selector accordingly. Details of this interlock mechanism are not shown herein, being fully shown and claimed in others of applicant's copending applications now issued as Patents Nos. 2,090,634, 2,060,807, 2,141,310 and 2,141,311.

In accordance with the present invention novel and highly effective means are provided for affording visual indication to the customer of the setting of the mill. Thus where an interlock mechanism such as above described is employed, the clerk is required to effect the setting of the mill to one of its several grinding positions. And means are provided which are operated in accordance with the setting of the grinding means for affording direct and easily visible indication to the customer, so that he will know the setting of the mill and whether it is set to produce ground coffee of the character desired.

The indicating mechanism may be conveniently associated with the cam 25 of the grade selector and the axially movable shaft 26 previously described. For this purpose said shaft is provided with a rack 35 adapted to have engagement with a pinion 36 mounted upon cross shaft 37. A lever arm 38 is fastened to shaft 37, and extends toward the side wall face of the mill. Attached to the lever arm is a plate 40 having a plurality of indicating positions thereupon arranged at varying locations over its face. The arrangement of these locations, as shown in Fig. 1, is preferably such that as the plate is pivotally moved through its range of adjustment, each of the indicating markings 41 will be brought successively into a reading position in a horizontal position. In such position they are adapted to cooperate with a sight opening 42 formed within the front plate 43 upon the face of the mill. This plate is otherwise closed so that only the one indication which is horizontally positioned, depending upon the position of adjustment of the grade selector means, and in alignment with opening 42, is visible. A light source 45, preferably controlled by the switch means 17 which also effects control of the motor operation is positioned in such relation to the indicator structure as to cast light thereupon. While the plate 40 may be formed of metal or the like, it is preferred to have it formed of a translucent material such as ground glass. The indications 41 thereon may then be formed by opaque lettering or the like, so that the lettering becomes clearly readable upon illumination of the plate. As shown, the markings may comprise the words "Open pot, Percolator, Drip pot, and Vacuum pot" corresponding to the several grades of fineness of grind as required in properly making coffee by the several methods.

In operation, in a device of this character the coffee to be ground is first placed within the hopper 14, and the lid 15 thereafter closed. The clerk having ascertained the customer's wishes in accordance with the method of making coffee utilized by such customer, effects adjustment of the grade selector 20 to the desired positioning to give the necessary fineness of grind. Preferably the bevelled face of the grade selector is provided with indications, cooperating with a fixed index point, readable from the rear or clerk's side of the mill so that his reading and adjustment will correspond with that indicated upon the customer's side. Having adjusted the mill to the desired setting, the corresponding marking 42 is brought into viewing position and the operation of the mill may be started by turning on the motor and opening the control gate, the coffee being ground to the indicated grade of fineness. Simultaneously with the energizing of the mill, the marking is clearly illuminated so that the customer is advised of the setting of the mill and if the clerk has failed to properly adjust the mill can promptly call attention to the fact. At the end of the grinding operation, the interlock action, where desired, again becomes effective to prevent subsequent operation of the mill until the grade selector has been returned to its off position, and again set to a predetermined grade of grind. It will be understood that the indicating device may be used with or without the interlock features as described.

Referring to Fig. 3, there is shown a modified means for causing actuation of the indicating mechanism. As shown, the cam 25 effects axial adjustment of shaft 26 which carries the interlock mechanism 28 as previously described. In place however of the rack and pinion, the shaft may be provided with a fixed lug 50 adapted to engage a follower 51 fixedly attached to cross shaft 37. As will be readily apparent, in response to the movement of the grade selector member, shaft 26 is caused to move axially as before, this axial movement bringing lug 50 against follower 51 in order to effect predetermined rotation of shaft 37 to provide corresponding positioning of the indicator means.

In Fig. 4 is shown a modified construction of indicating means. In this construction the shaft 60 corresponds with shaft 37 and may be operated in the same manner in accordance with the setting of the grade selector mechanism. In accordance with this construction however the face 61 of the mill is provided with a plate carrying the several indications of fineness of grind thereon, and provided with light transmitting sections or jewels 62. These sections which may be provided with numerals, as illustrated, to show, in accordance with the particular one illuminated, the setting of the mill and legends are preferably associated with the numerals to show the fineness of grind or the like. Selective illumination of the several markings is accomplished by means of the light shielding member 63 in arcuate form, which is adapted to be pivotally moved in response to the turning of shaft 60. Member 63 is provided with a light transmitting portion 64 of such shape that it overlies the jewels 62, one at a time, in its range of adjusting movement. A light source similar to that described above is provided in the rear of plate 61, and light is thus selectively permitted to pass into illuminating relation with a predetermined jewel or marking 62 in accordance with the location of opening 64. In order to make the jewel light up brilliantly with a single light source, the light may be made in tubular form and mounted vertically; further the lower edge of opening 64 may be provided with a light reflecting surface adapted to reflect the light from the source toward the jewels, in each position of adjustment.

In Figs. 5 and 6 is shown a still further modified construction. In accordance with this construction means are provided for selectively illuminating a predetermined legend marking means. Thus the face of the mill 70 is provided with a series of translucent plates 71 bearing markings or legends thereon showing the fineness of grind and of different light responsive properties than the plates. The plates are located in predetermined arrangement, each being provided with a light source 72 in light transmitting relation thereto. Each legend is enclosed with its own light source and is protected against illumination from any light source except the one directly associated therewith, so that upon energizing any of the light sources 72 only that legend directly associated therewith will be caused to be illuminated.

Means are provided for causing selective illumination of the appropriate marking in accordance with the setting of the grade selector means. This comprises switch means 75 which is arranged to be operated in accordance with the position of the grade selector member 20. For this purpose an insulating ring 76, which may be an integral part of the mill casing, carries an inner continuous contact 77, and an outer series of contacts 78, insulated from each other, and separately connected each to one terminal of the several light sources 72. The two sets of contacts 77 and 78 are located in corresponding positions adjacent each other, and are adapted to be engaged by a pair of contact brushes 79, 80, which are housed within an insulating contact assembly 81 carried by and movable with the adjustable grade selector means 20. Spring means 82 urges each of the contact members into engagement with the fixed contacts 77 and 78. Thus in response to the turning of the grade selector member 20 to the several positions of adjustment thereof, the contact assembly 75 provides for establishing contact from the ring 77 to that one of contacts 78 corresponding to the setting of the mill. Suitable connections from a power source 83, as shown in Fig. 5, provide for the corresponding illumination of the associated light source 72 which effects the illumination of the proper sign to indicate clearly to the customer the setting of the mill. When the grade selector is turned to the neutral or non-grind position the contact pins 79, 80 move beyond the range of the fixed contacts, into a position such as that illustrated in dotted lines in Fig. 5. In such position of adjustment none of the light sources is energized and all the markings remain unilluminated.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A coffee mill of the character described which comprises grinding means, a casing for enclosing said grinding means, grade selector means including a rotatable member accessible from the exterior of said casing for adjusting the grinding means to vary the fineness of grind and provide for grinding a plurality of grades each of predetermined different fineness, and means for indicating to a customer the setting of said grinding means including a rack mounted for axial movement within said casing, means including a cam surface on said rotatable member for directly moving said rack in accordance with movement of said grade selector means in either direction, a rotatable shaft extending substantially transversely of the axis of said rack and having a pinion adapted to effect rotation of the shaft in accordance with axial movement of the rack in either direction, an indicator plate positioned within said casing closely adjacent a wall thereof and having a plurality of markings each indicative of one of said predetermined different grades of fineness of grind, said wall of the casing having a sight opening providing for viewing individual markings on said indicator plate, and means for mounting said indicator plate for shifting movement thereof upon rotation of said rotatable shaft to effect individual registration of said markings with said sight opening in accordance with the setting of said grinding means.

2. A coffee mill of the character described which comprises grinding means, a casing for enclosing said grinding means, grade selector means including a rotatable member accessible from the exterior of said casing for adjusting the grinding means to vary the fineness of grind and provide for grinding a plurality of grades each of predetermined different fineness, and means for indicating to a customer the setting of said grinding means including a shaft mounted in said casing for movement along the longitudinal axis thereof, means including a cam surface on said rotatable member for effecting direct axial movement of said shaft in accordance with the movement of said grade selector means in either direction, a second shaft rotatably mounted within said casing and extending substantially transversely of said first shaft, means providing a driving connection between said first shaft and said second shaft for effecting rotation of the second shaft in accordance with axial movement of the first shaft in either direction, an indicator plate positioned within said casing closely adjacent a wall thereof and having a plurality of markings each indicative of one of said predetermined different grades of fineness of grind, said indicator plate and said markings thereon being of contrasting characteristics as to light transmitting properties, said wall of the casing having a sight opening providing for viewing individual markings on said indicator plate, means for mounting said indicator plate for shifting movement thereof upon rotation of said second shaft to effect individual registration of said markings with said sight opening in accordance with the setting of said grinding means, and illuminating means positioned in said casing in rear of said indicator plate for effecting contrasting illumination of the markings visible through said sight opening.

3. A coffee mill of the character described which comprises grinding means, a casing for enclosing said grinding means, grade selector means including a rotatable member accessible from the exterior of said casing for adjusting the grinding means to vary the fineness of grind and provide for grinding a plurality of grades each of predetermined different fineness, and means for indicating to a customer the setting of said grinding means including a shaft mounted for axial movement within said casing, means cooperating with said rotatable member for effecting movement of said shaft in accordance with movement of the grade selector means in either direction, a rotatable shaft extending substantially transverse of the axis of said axially movable shaft, means interconnecting said shafts for rotation of the latter in accordance with axial movement of the former, an indicator plate positioned within said casing closely adjacent a wall thereof and having a plurality of markings each indicative of one of said predetermined different grades of fineness of grind, said wall of the casing having a sight opening providing for viewing individual markings on said indicator plate, and means for mounting said indicator plate for shifting movement thereof upon rotation of said rotatable shaft to effect individual registration of said markings with said sight opening in accordance with the setting of said grinding means.

DAVID A. MEEKER.